United States Patent
Fujiwara et al.

[11] Patent Number: 5,968,123
[45] Date of Patent: Oct. 19, 1999

[54] METHOD AND DEVICE EMPLOYING LOCATION CONFIRMATION BY A SERVER OR A BRIDGE FOR CONTROLLING MOBILE HOST POSITION IN LOCAL AREA NETWORK

[75] Inventors: Ryuhei Fujiwara; Seiji Shimizu, both of Tokyo, Japan

[73] Assignee: NEC Corporation, Japan

[21] Appl. No.: 08/886,577

[22] Filed: Jul. 1, 1997

[30] Foreign Application Priority Data

Jul. 1, 1996 [JP] Japan ................................. 8-171136

[51] Int. Cl.⁶ .................................................. G06F 13/00
[52] U.S. Cl. ......................... 709/223; 709/224; 370/401
[58] Field of Search .................................. 709/217, 218, 709/219, 220, 223, 224, 225, 227, 230, 238, 242, 243, 249; 370/401, 338, 400; 455/5.1, 422, 433, 435

[56] References Cited

U.S. PATENT DOCUMENTS

| | | | |
|---|---|---|---|
| 5,212,806 | 5/1993 | Natarajan | 455/525 |
| 5,490,139 | 2/1996 | Baker et al. | 370/312 |
| 5,504,746 | 4/1996 | Meier | 370/256 |
| 5,530,963 | 6/1996 | Moore et al. | 395/200.73 |
| 5,781,863 | 7/1998 | Bales et al. | 455/456 |
| 5,841,769 | 11/1998 | Okanoue et al. | 370/338 |

FOREIGN PATENT DOCUMENTS

| | | |
|---|---|---|
| 4-154335 | 5/1992 | Japan . |
| 4-217141 | 8/1992 | Japan . |

*Primary Examiner*—Vit D. Vu
*Attorney, Agent, or Firm*—Ostrolenk, Faber, Gerb & Soffen, LLP

[57] ABSTRACT

There is disclosed a method for controlling the position of a mobile host in a local area network (LAN), whereby the movement of the mobile host out of a certain LAN can be quickly detected even when the mobile host transmits no frames and invalid traffic can be reduced. A server 3 duplicates a learning function table in a bridge device 2 at each specified time. Location confirmation is performed for the currently connected mobile host based on this duplicated information at each specified time. If the mobile host gives no response to the location confirmation, the movement of this mobile host is determined and the learning function table in the bridge device 2 is renewed. Thus, even when the mobile host is moved out of the LAN and no frames are transmitted therefrom, the movement of the mobile host can be quickly detected and invalid traffic can be reduced.

5 Claims, 7 Drawing Sheets

METHOD AND DEVICE EMPLOYING LOCATION CONFIRMATION BY A SERVER OR A BRIDGE FOR CONTROLLING MOBILE HOST POSITION IN LOCAL AREA NETWORK

BACKGROUND OF THE INVENTION

The present invention relates to host position control among a plurality of local area networks (referred to as LANs, hereinafter) in a system in which the LANs are interconnected by a bridge, and more particularly to a method and a system for controlling a mobile host which uses a radio medium.

In a bridge device for interconnecting LANs, a mobile host connected to these LANs is confirmed by monitoring a transmission originating address SA (Source Address) for a frame flowing on each of the LANs. The bridge device provides efficient frame transfer based on information regarding the position of the mobile host, which is obtained in the above-described manner.

Referring to FIG. 7 which illustrates the constitution of a bridge device 13, the bridge device 13 shown includes a learning function table 14, an exchanging/learning control section 15 and line connecting sections 16 and 17. The line connecting sections 16 and 17 perform connection with each LAN. The learning function table 14 registers the address of each mobile host connected to LANs (1) 11 and (2) 12. The exchanging/learning control section 15 absorbs a difference in protocol between the LANs and controls address registration performed by the learning function table 14.

When each LAN as a network is constituted by using a multiple address medium, for instance Ethernet presented by Xerox Company of US, frame transfer is performed under the following rules.

1. If the destination address DA (Destination Address) of a received frame is a multiple address, multiple address transfer is performed for all LANs other than a LAN which has received the frame.

2. Regarding a mobile host specified by the destination address DA of a received frame, if a LAN to which the mobile host is connected is determined and this LAN is discovered to be different from a LAN which has received the frame, transfer is performed for the LAN to which the specified mobile host is connected.

3. Regarding a mobile host specified by the destination address DA of a received frame, if a LAN to which the mobile host is connected is determined and this LAN is identical to the LAN which has received the frame, since all the nodes of this LAN can receive the frame, this received frame which needs not to be transferred is canceled.

4. Regarding a mobile host specified by the destination address DA of a received frame, if a LAN to which the mobile host is connected is not determined, transfer is performed for all LANs other the LAN which has received the frame.

If a mobile host is moved among LANs, the bridge device determines that the mobile host is connected to a plurality of LANs. Consequently, a contradiction occurs in positional information. Efforts have been made to solve this problem. For example, referring to JP-A-217141/1992 or JP-A-154335/1992, there is disclosed a bridge device, which monitors a frame flowing through segments and renews information regarding the position of a mobile host immediately after detection of the movement of the mobile host. However, in the case of the LAN using a radio medium, a destination which the mobile host has reached may be outside the range of radio transmission or the mobile host itself may not send any frames. In such a case, in the prior art, positional information is not renewed and useless radio traffic is produced because of the continuance of frame transfer by the bridge device. Consequently, radio wave resources are wasted for nothing.

Such a situation occurs because if the mobile host is not under the control of the bridge device, unnecessary frame transfer is not recognized. Therefore, wasteful consumption of power by the bridge device has been another problem to be solved.

SUMMARY OF THE INVENTION

The present invention was made to solve the above-discussed problems.

A purpose of the present invention is to provide an art for controlling a mobile host, whereby even when the mobile host is moved from its corresponding LAN, transmission of useless traffic to the mobile host is suppressed and wasteful consumption of power is reduced.

The purpose of the present invention is achieved by a method for controlling a mobile host, in which a plurality of local area networks are interconnected by a bridge, the bridge includes a learning function table for each local area network and a server is connected to each local area network in which the mobile host is registered in the learning function table and its position is controlled.

The server duplicates the learning function table corresponding to the local area network to which it is connected and requests the mobile host in the local area network to which it is connected to make a response to location confirmation. Then, the server erases the registered mobile host which gives no response to location confirmation from the learning function table of the bridge.

With the method for controlling the mobile host thus constructed, the movement of the mobile host out of the LAN can be quickly determined by periodic confirmation performed by the server. Accordingly, even when a certain mobile host in the LAN is moved out, invalid traffic can be reduced by quickly rewriting the content of the learning function table in the bridge device. Especially, in the case of a system using a radio medium, radio wave resources can be effectively utilized.

In addition, since the bridge device sends no useless traffic, especially in the system using a radio medium, power consumption by the system can be reduced.

The same effect can also be obtained by providing the server function in the bridge.

BRIEF DESCRIPTION OF THE DRAWINGS

This and other objects, features and advantages will become more apparent upon a reading of the following detailed description of the present invention and drawings, in which.

DESCRIPTION OF THE PREFERRED EMBODIMENTS

The preferred embodiments of the present invention will be described with below reference to the accompanying drawings.

(First Embodiment)

Figure 1:
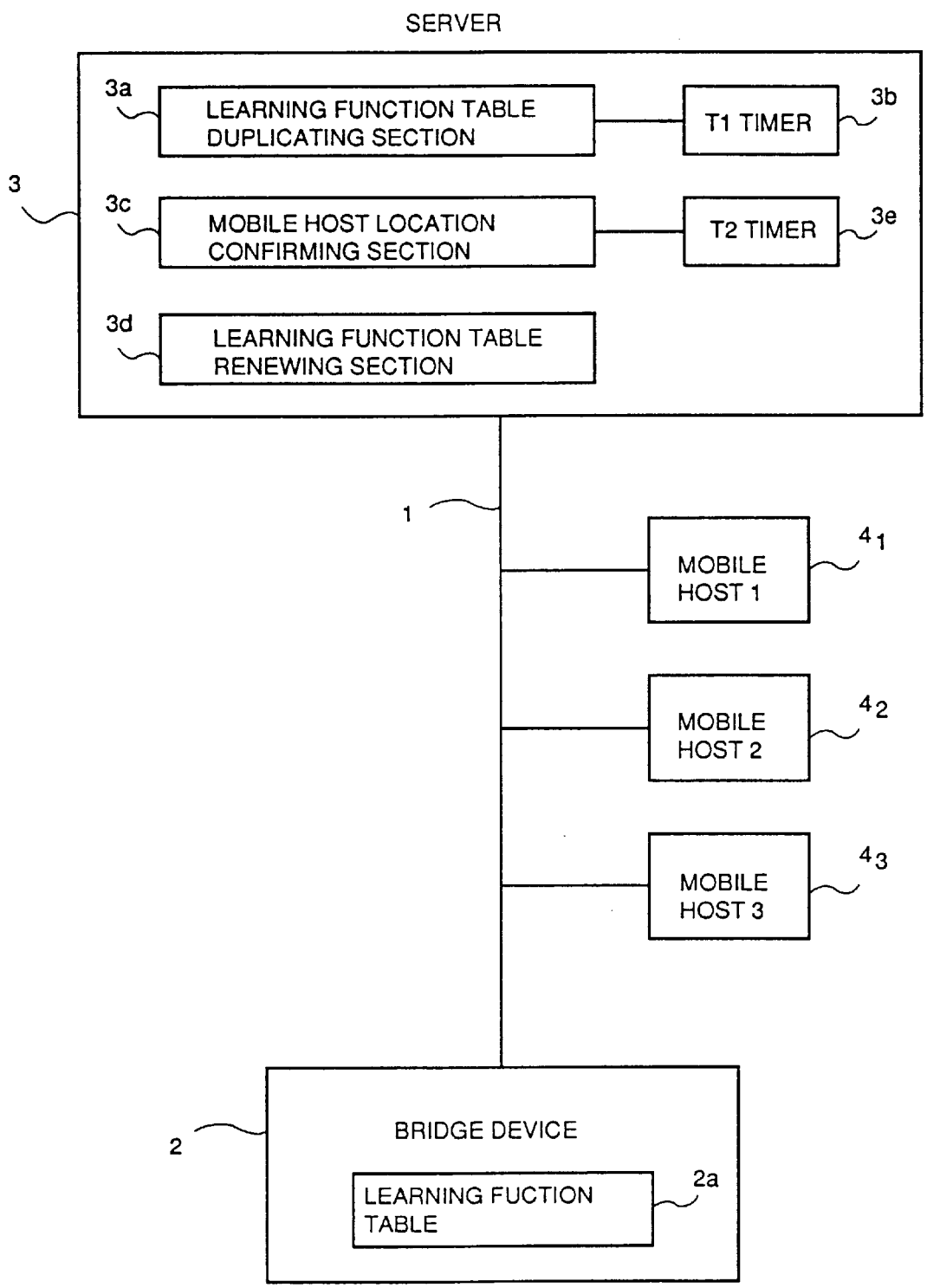
FIG. 1 is a view showing a basic constitution of a first embodiment.
Figure 2:
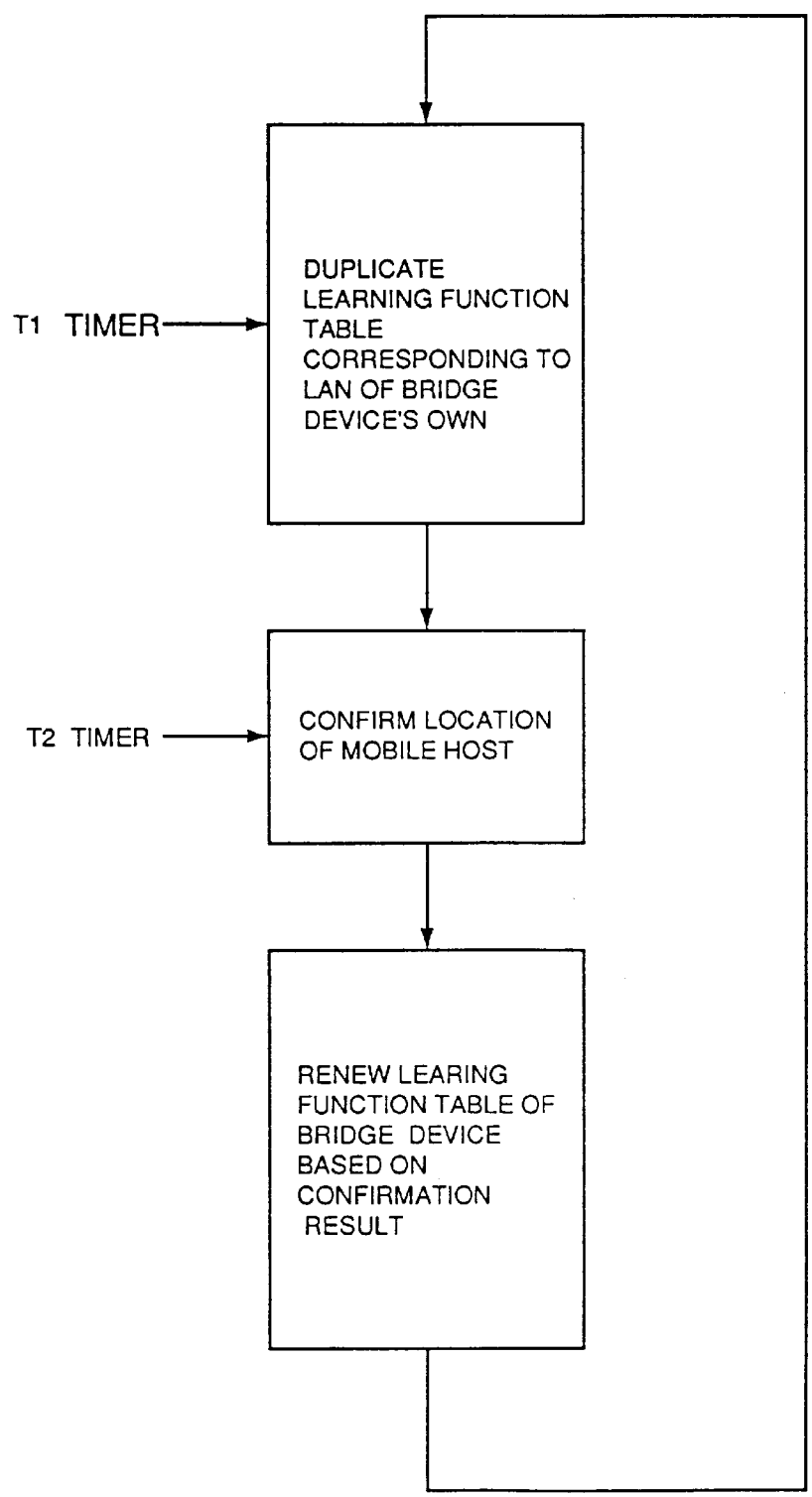
FIG. 2 is a flow chart showing an operation of the first embodiment.
Figure 3A:
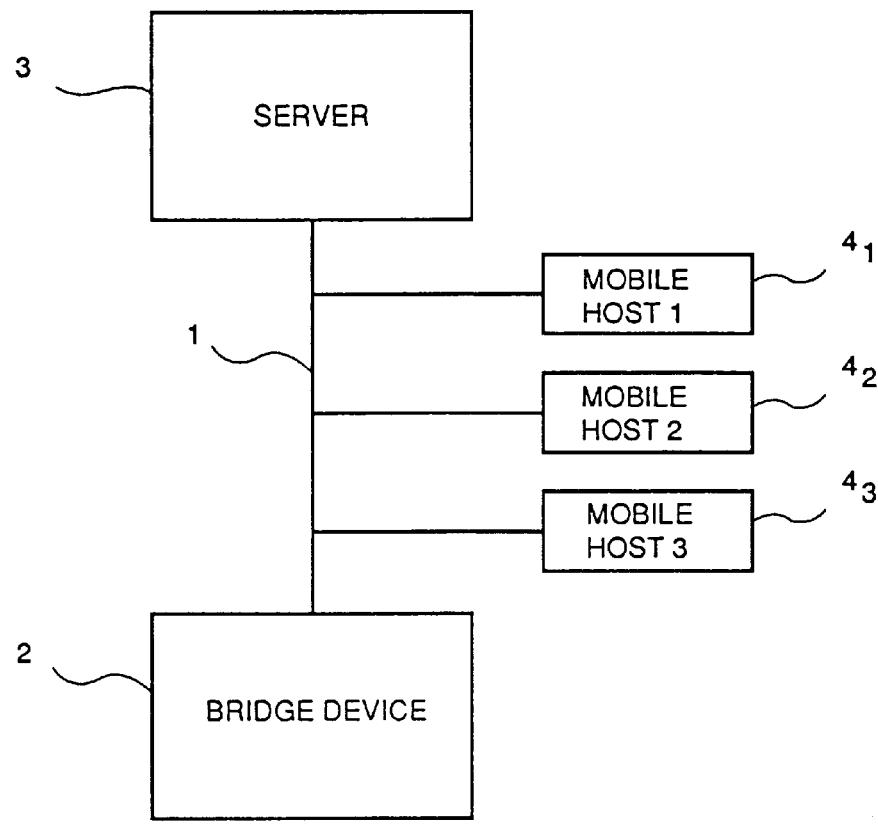
FIG. 3A is a view showing a system constitution before a mobile host is moved.
Figure 3B:
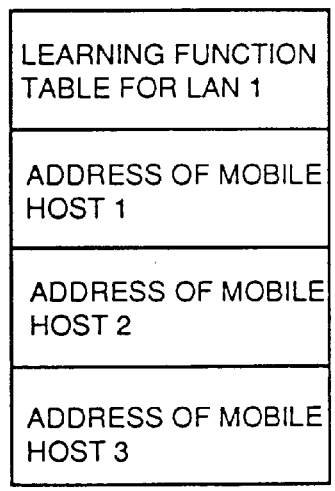
FIG. 3B is a view showing a content of a learning function table before the mobile host is moved.
Figure 4A:
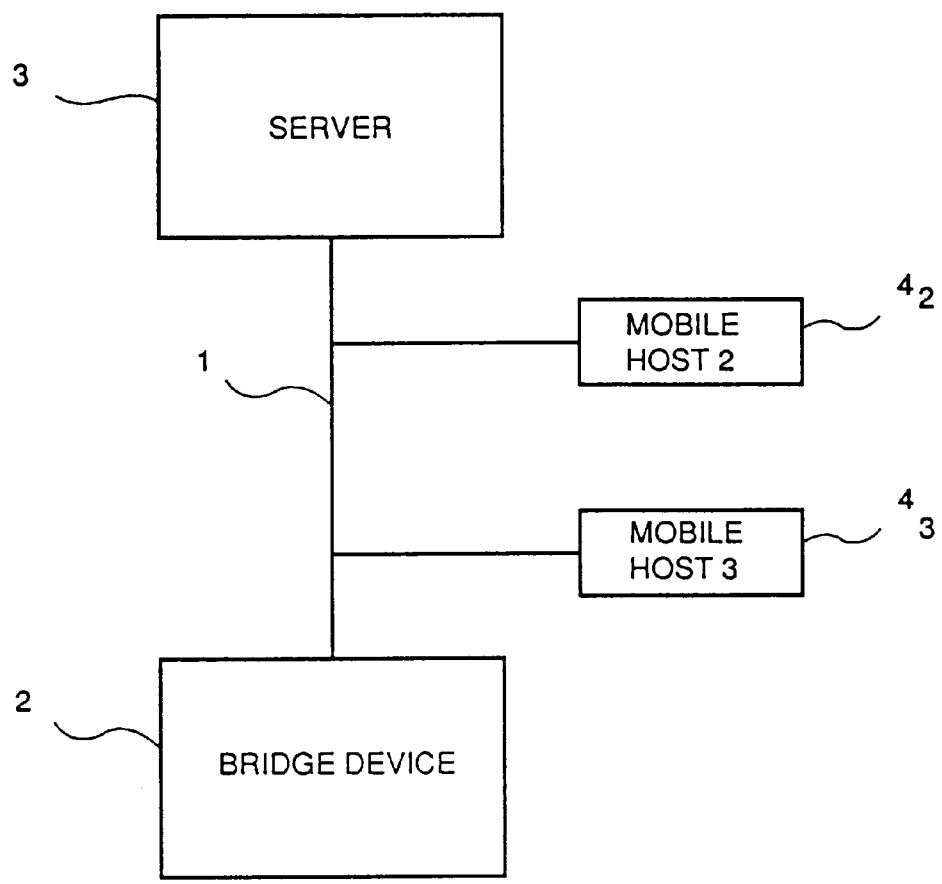
FIG. 4A is a view showing a system constitution after the mobile host is moved.
Figure 4B:
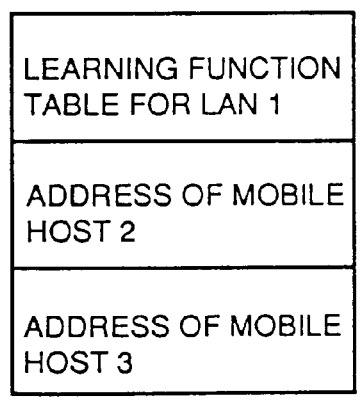
FIG. 4B is a view showing a content of the learning function table after the mobile host is moved.
Figure 5:
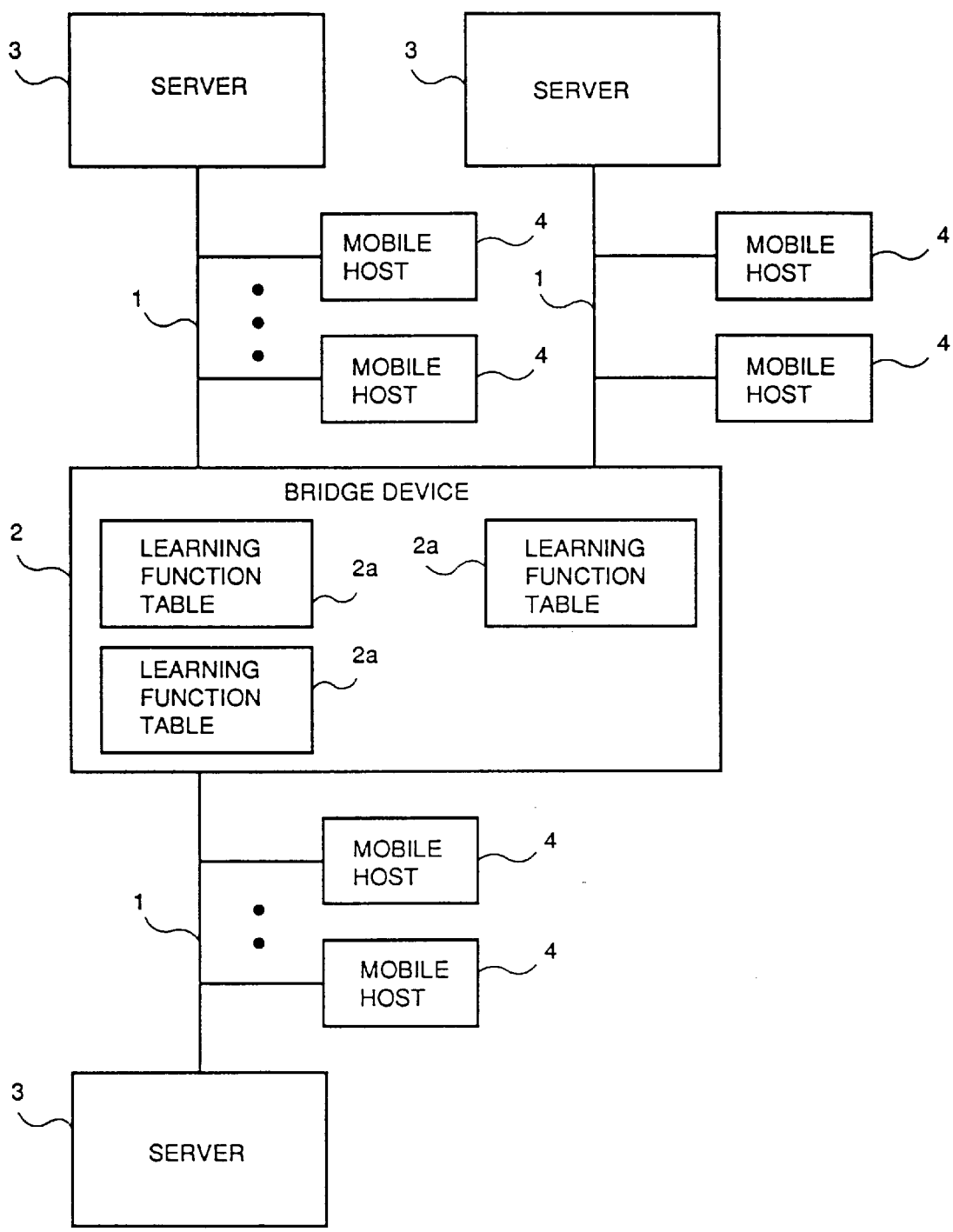
FIG. 5 is a view showing an entire constitution of FIG. 1.

FIG. 1 is a view showing the basic constitution of the first embodiment. FIG. 2 is a flow chart showing the operation of the first embodiment shown in FIG. 1. FIG. 3A is a view showing a system constitution before a mobile host is moved. FIG. 3B is a view showing the content of a learning function table before the mobile host is moved. FIG. 4A is a view showing a system constitution after the mobile host is moved. FIG. 4B is a view showing the content of the learning function table after the mobile host is moved. FIG. 5 is a view showing the entire constitution of the first embodiment shown in FIG. 1.

Referring now to FIG. 1, 1 denotes a local area network, 2 a bridge device, 2a the learning function table of the bridge device, 3 a server, 3a a learning function table duplicating section in the server, 3b a T1 timer, 3c a section for confirming the location of a mobile host, 3d a learning function table renewing section, 3e a T2 timer and 41, 42 and 43 mobile hosts 1, 2 and 3 respectively in the LAN 1.

Figure 7:
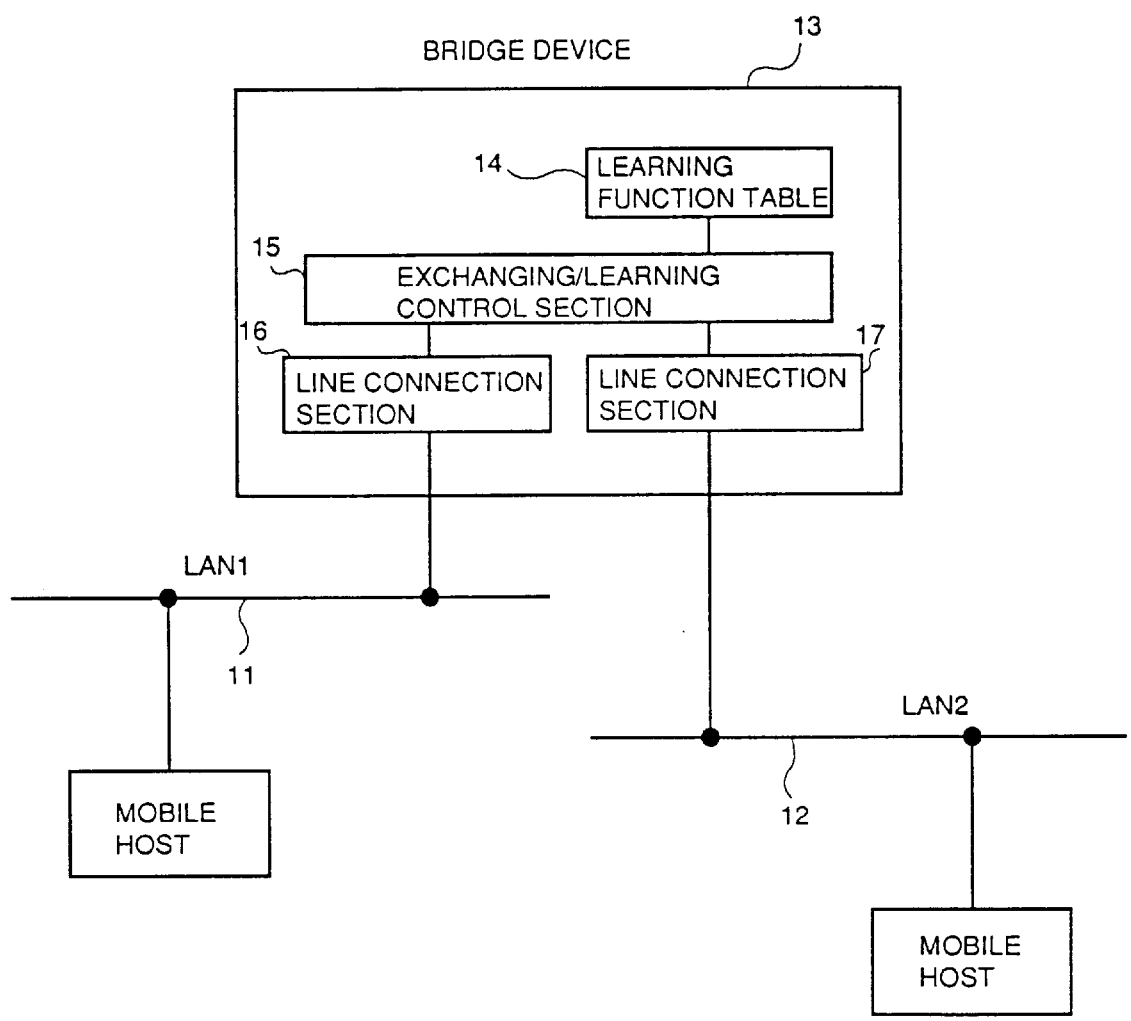
FIG. 7 is a view showing a constitution of a conventional bridge device.

The basic constitution of the bridge device 2 is similar to that of a bridge device shown in FIG. 7.

The specific operation of the first embodiment will be now described with reference to FIGS. 1 to 4. In the system constitution shown in FIG. 1, when each mobile host is engaged in communication as shown in FIG. 3A, the address of each of the mobile hosts 1, 2 and 3 is registered in the learning function table 2a as shown in FIG. 3B. Thereafter, when the mobile host 1 is moved out of the LAN 1 as shown in FIG. 4A, the mobile host location confirming section 3c in the server 3 performs confirmation for the location of the mobile host registered in the LAN 1 for each measuring performed by using the timer T2.

For the address of the mobile host whose location is to be confirmed at this time, the learning function table connected to a server of its own from the bridge device 2 has been duplicated beforehand for each timer T1 by the learning function table duplicating section.

Since the mobile host 1 gives no response to the confirmation, the server determines that the mobile host 1 is not in the LAN 1 and issues an instruction from the learning function table renewing section for renewing the learning function tables in the bridge device 2 and in the server. Consequently, since the address of the mobile host 1 is erased from the learning function table, no frames addressed to the mobile host 1 will be transferred through the bridge thereafter.

FIG. 5 illustrates the entire constitution of the first embodiment. As shown in the drawing, there are a plurality of local area networks interconnected by the bridge device. A server is provided for each local area network corresponding to a mobile host. For each local area network, the learning function table in the bridge, which is used for confirming the location of the mobile host, is duplicated at each specified time. Location confirmation is performed at each specified time based on the information of the learning function table. If no response is given from the mobile host to the confirmation, its registered address is erased from the learning function table in the bridge.

(Second Embodiment)

Figure 6:
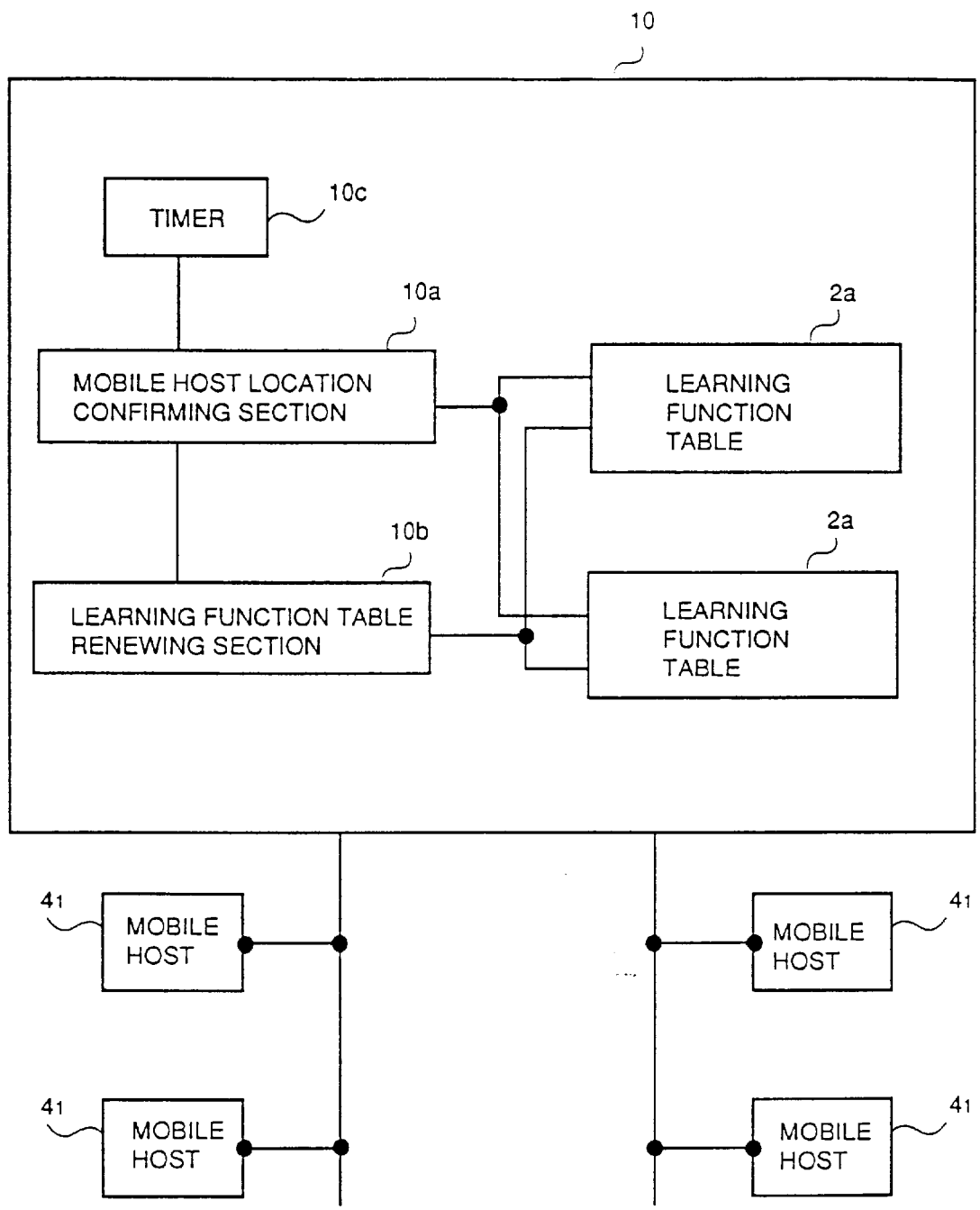
FIG. 6 is a view showing a constitution of a second embodiment.

FIG. 6 illustrates the entire constitution of the second embodiment.

In the second embodiment, a server function similar to that described above is provided in a bridge device 10. Accordingly, a mobile host location confirming section 10a, a learning function table renewing section 10b and a timer 10c shown in the drawing perform the same functions as those performed respectively by the above-described mobile host location confirming section 3c, the learning function table renewing section 3d and the T1 timer 3e. However, since the bridge device 10 has a learning function table for each LAN, means similar to the above-described learning function table duplicating section 3a is not necessary.

In the bridge device 10 constructed in the above-noted manner, confirmation for the location of the mobile host is performed by the mobile host location confirming section 10a based on the learning function table of each LAN in the bridge for each timing up of the timer 10c. If no response is given from the mobile host to the confirmation, the registered address of the mobile host which gives no response is erased from the learning function table in the bridge by the learning function table renewing section 3d.

As apparent from the foregoing, with the mobile host control method of the present invention, since the movement of the mobile host out of the LAN can be quickly determined by periodical confirmation performed by the server, even when the mobile host in a certain LAN is moved out of the LAN, the content of the learning function table in the bridge device can be quickly rewritten and invalid traffic can be erased. Especially, in the case of the system using a radio medium, radio wave resources can be effectively utilized.

Also, since the bridge device sends no unnecessary radio traffic, especially in the system using a radio medium, power consumption by the system can be reduced.

Furthermore, the same effect can be achieved by providing the server function in the bridge.

The entire disclosure of Japanese Patent Application No. 171136 filed on Jul. 1, 1996, including specification, claims, drawings and summary are incorporated herein by reference in its entirety.

What is claimed is:

1. A method for controlling a position of a mobile host in a local area network, a plurality of local area networks being interconnected by a bridge, said bridge including a learning function table for each of said local area networks and said mobile host being registered in said learning function table and position-controlled, said method for controlling said position of said mobile host comprising in a server connected to each of said local area networks:

a step of duplicating a learning function table corresponding to a local area network to which said sever is connected;

a step of requesting a mobile host in said local area network to which said server is connected to respond to location confirmation based on said duplicated learning function table; and a step of deleting registration of said mobile host which gives no response to said location confirmation from said learning function table.

2. The method for controlling a mobile host in a local area network of claim 1, wherein said steps of duplicating said learning function table and requesting responses to location confirmation are repeated at specified times.

3. A system for controlling a position of a mobile host in a local area network comprising:

a bridge for interconnecting a plurality of local area networks; and a server connected to each of said local area networks, wherein said bridge includes a learning function table in which said mobile host located in one of said local area networks is registered for each of said local area networks, and said server includes means for duplicating a learning function table corresponding to one of said local area networks to which said server is connected, means for transmitting location confirmation to said mobile host in said local area network to which said server is connected based on said duplicated learning function table and means for deleting registration of said mobile host which gives no response to said location confirmation from said learning function table of said bridge.

4. The system for controlling a mobile host in a local area network of claim 3, wherein said server includes a timer and said means for duplicating a learning function table includes means for duplicating said learning function table at specified times of confirmation performed by using said timer.

5. The system for controlling a mobile host in a local area network of claim 3, wherein said server includes a timer and said means for transmitting said location confirmation includes means for transmitting location confirmation to said mobile host located in said local area network to which said server is connected at specified times of confirmation performed by using said timer.

* * * * *